US010029324B2

United States Patent
Niu et al.

(10) Patent No.: US 10,029,324 B2
(45) Date of Patent: Jul. 24, 2018

(54) WIRE ELECTRIC DISCHARGE MACHINE HAVING CORNER SHAPE COMPENSATION FUNCTION

(71) Applicant: FANUC Corporation, Yamanashi (JP)

(72) Inventors: Yan Niu, Yamanashi (JP); Koji Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 274 days.

(21) Appl. No.: 14/630,982

(22) Filed: Feb. 25, 2015

(65) Prior Publication Data

US 2015/0239055 A1   Aug. 27, 2015

(30) Foreign Application Priority Data

Feb. 26, 2014  (JP) ................. 2014-035463

(51) Int. Cl.
*B23H 1/02*   (2006.01)
*B23H 7/06*   (2006.01)
*G05B 19/4103*   (2006.01)

(52) U.S. Cl.
CPC .............. *B23H 1/02* (2013.01); *B23H 7/065* (2013.01); *G05B 19/4103* (2013.01); *G05B 2219/45043* (2013.01); *G05B 2219/49119* (2013.01)

(58) Field of Classification Search
CPC . B23H 7/02; B23H 7/20; B23H 7/065; B23H 2300/10; B29C 65/22; B29C 65/221; B29C 65/222; B29C 59/10
USPC ...................................... 219/69.12
See application file for complete search history.

(56) References Cited

U.S. PATENT DOCUMENTS

| | | | |
|---|---|---|---|
| 5,021,622 A | 6/1991 | Magara et al. | |
| 6,774,334 B1 | 8/2004 | Kobayashi | |
| 6,922,606 B1* | 7/2005 | Yutkowitz | G05B 19/00 318/560 |
| 2005/0263493 A1* | 12/2005 | Kurihara | B23H 7/04 219/69.12 |
| 2011/0100959 A1* | 5/2011 | Onodera | B23H 7/065 219/69.13 |
| 2011/0226742 A1 | 9/2011 | Onodera et al. | |

(Continued)

FOREIGN PATENT DOCUMENTS

| | | |
|---|---|---|
| CN | 1413134 A | 4/2003 |
| CN | 101602130 A | 12/2009 |
| CN | 103231135 A | 8/2013 |

(Continued)

OTHER PUBLICATIONS

Extended European Search Report dated Jun. 26, 2015, corresponding to European patent application No. 15155152.0.

(Continued)

*Primary Examiner* — Brian Jennison
(74) *Attorney, Agent, or Firm* — Hauptman Ham, LLP

(57) ABSTRACT

In wire electric discharge machining performed with a wire electrode moved relative to a workpiece based on a desired shape, a command speed is controlled so that the discharge densities per unit distance in circular-arc and straight portions of the desired shape are equal, in consideration of the difference in arc length between a circular-arc portion in a desired shape and the corresponding portion of a machining path, whereby the shape accuracy of the circular-arc portion is improved.

8 Claims, 7 Drawing Sheets

(56) References Cited

U.S. PATENT DOCUMENTS

2014/0330423 A1    11/2014   Hara et al.

FOREIGN PATENT DOCUMENTS

| EP | 2133167 A2 | 12/2009 |
| EP | 2272614 A2 | 1/2011 |
| EP | 2327498 A2 | 6/2011 |
| JP | 63-105829 A | 5/1988 |
| JP | H06-126536 A | 5/1994 |
| JP | 2001-162446 A | 6/2001 |
| JP | 2004-148472 A | 5/2004 |
| JP | 4143384 B2 | 9/2008 |
| JP | 2011-31384 A | 2/2011 |
| JP | 2011-110649 A | 6/2011 |
| JP | 5077433 B | 11/2012 |
| JP | 5241850 B2 | 7/2013 |
| WO | 2010001472 A1 | 1/2010 |
| WO | 2013/105235 A1 | 7/2013 |

OTHER PUBLICATIONS

Office Action dated Jul. 14, 2015, corresponding to Japanese patent application No. 2014-035463.
Office Action in CN Application No. 201510087764.3 dated Dec. 5, 2016.

* cited by examiner

FIG. 8A
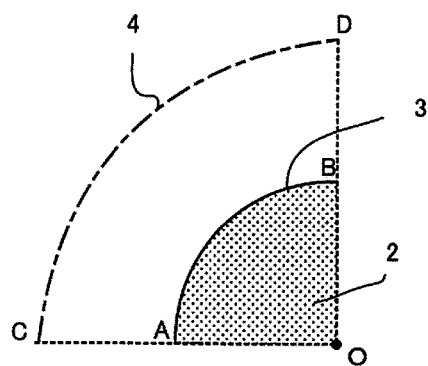
FIG. 8B
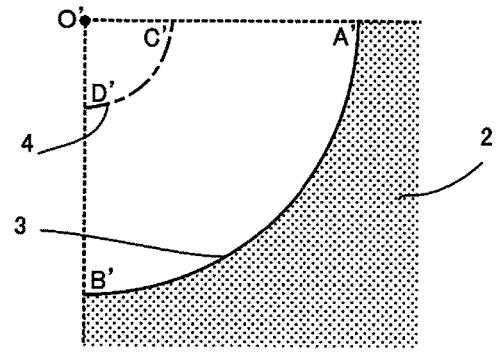
FIG. 9
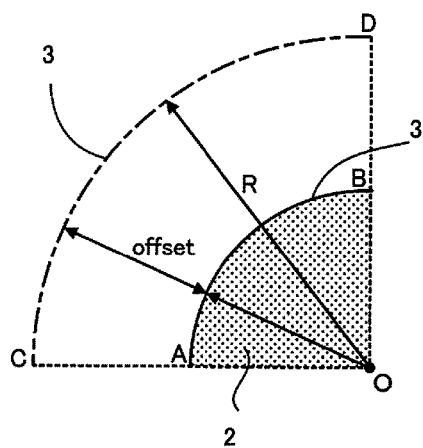
FIG. 10
```
O0001
G92X0.0Y0.0
S2D1G04X2.        ← D1 : OFFSET NUMBER
G91G01G42Y-5.0
G01X-4.5
G02X-0.5Y0.5R0.5  ← R0.5 : ARC RADIUS
G01Y2.0
G40Y5.0
M30
```
FIG. 11
| OFFSET NUMBER | 1 | 2 | 3 | 4 | ..... |
|---|---|---|---|---|---|
| OFFSET VALUE | 0.1 | 0.15 | 0.2 | 0.25 | ..... |

WIRE ELECTRIC DISCHARGE MACHINE HAVING CORNER SHAPE COMPENSATION FUNCTION

RELATED APPLICATIONS

The present application claims priority to Japanese Application Number 2014-035463, filed Feb. 26, 2014, the disclosure of which is hereby incorporated by reference herein in its entirety.

BACKGROUND OF THE INVENTION

Field of the Invention

The present invention relates to a wire electric discharge machine configured to perform speed commanding in consideration of the difference between a circular-arc portion of a desired shape and its corresponding portion of a machining path.

Description of the Related Art

In wire electric discharge machining, a desired shape is usually created with reference to a drawing. A movement path of the center of a wire, based on this desired shape in consideration of the discharge gap, wire diameter, etc., is referred to as "machining path" herein. The discharge gap, wire diameter, etc., as added conditions, are collectively referred to as "offset".

FIGS. 1A and 1B show how convex and concave circular-arc portions of a workpiece are subjected to wire electric discharge machining, respectively. In these drawings, reference numerals 3 and 4 denote a desired shape (full line) and a machining path (dotted line), respectively. The offset is the difference between the machining path 4 and the desired shape 3.

In actual machining, a computerized numerical controller attached to a wire electric discharge machine controls the wire electric discharge machine so that a wire electrode (wire) relatively moves along the machining path, thereby finishing the workpiece into the desired shape. A straight portion of the desired shape extends parallel to its corresponding portion of the machining path. As shown in FIG. 1A, therefore, the workpiece is machined for an arbitrary distance L as the wire moves for the same distance L. Thus, the moving distance of the wire is equal to the machining length of the workpiece.

In the case of a convex circular-arc portion to be machined, however, a distance a' for the desired shape 3 is shorter than a length a of its corresponding portion of the machining path 4, as shown in FIG. 1A. Consequently, a length a' of the workpiece to be machined as the wire moves for the distance a along the machining path 4 is shorter than the length a, so that the discharge density becomes so high that the workpiece is over-machined or machined deeper than in the machining of the straight portion.

In the case of a concave circular-arc portion to be machined, in contrast, a machining distance b' for the desired shape 3 is longer than a length b of its corresponding portion of the machining path 4, as shown in FIG. 1B. Consequently, a length b' of the workpiece to be machined as the wire moves for the distance b along the machining path 4 is longer than the length b, so that the discharge density becomes so low that under-machining occurs more easily than in the machining of the straight portion. Thus, over-machining and under-machining occur in the cases of machining the convex and concave circular-arc portions, respectively, so that the shape accuracy is inevitably reduced.

The following is a description of some examples of prior art techniques proposed to solve these problems.

A: Technique for Limiting Speed at Circular-Arc Portion

A-1: Japanese Patent Application Laid-Open No. 2001-162446 discloses a control method for wire electric discharge machining. If a machining path for the wire electric discharge machining includes an arcuate path portion, according to this method, machining conditions for the arcuate path portion are calculated based on conditions for electric discharge machining in a normal straight-line machining range and a function of an arc radius as a variable, in order to improve shape sagging in the arcuate path portion. In addition, a high-speed machining condition is applied to machining in the normal straight-line machining range, while machining along an arcuate machining path is controlled under a medium-speed machining condition.

In the technique described above, the straight portion is machined under the high-speed condition, and the circular-arc portion is machined under the medium-speed condition. In the case of the convex circular-arc portion, however, the machining distance for the desired shape is shorter than a length of its corresponding portion of the machining path, so that a distance a' for which a workpiece is machined as a wire moves for an arbitrary distance is shorter than the distance a. Therefore, the discharge density becomes so high that the workpiece is over-machined or machined deeper than in the machining of the straight portion. To prevent this over-machining, the convex circular-arc portion should be machined more quickly than the straight portion. According to this technique, however, the convex circular-arc portion is machined under the medium-speed condition or more slowly than the straight portion. As a result, the shape accuracy of the circular-arc portion is inevitably reduced.

A-2: Japanese Patent Application Laid-Open No. 6-126536 discloses a wire electric discharge machine comprising calculation means configured to calculate a command speed by adding a speed change amount obtained based on an error voltage to a previous calculated value, calculate a speed target value based on a function of a programmed arc radius and an electrode offset amount in circular-arc machining, and set the speed target value as the command speed if the command speed is not less than the speed target value.

In the technique described above, command speeds for circular-arc portions are calculated by the same method as those for straight portions, and the upper limit value of the speed is calculated based on the function of the programmed arc radius and the electrode offset amount. In the case of circular-arc portions, as described with reference to FIGS. 1A and 1B, however, the desired shape and the machining path are different in arc radius. If the command speed for the circular-arc portion is calculated in the same method as for the straight portion, therefore, the desired shape cannot always be obtained. Further, some coefficients are needed to calculate the upper limit value of the speed for the circular-arc portion, and a method for obtaining these coefficients is not specified. Thus, experimental acquisition of these coefficients requires much time and labor.

According to the techniques A-1 and A-2, the shape accuracy of the circular-arc portion is improved by limiting the speed for the circular-arc portion.

B: Technique for Limiting Machining Speed at Corner Portion by Machining Amount

B-1: Japanese Patent No. 5241850 (corresponding to WO2010/050014) discloses a wire electric discharge machine in which a machining speed for each locus of the center of a wire at a corner portion is limited by a corner speed limiting unit, depending on an estimated machining amount, and a machining condition for each machining step is compensated according to the arc radius of a programmed locus at a portion corresponding to the corner portion.

In the technique described above, a machining speed for the corner portion is controlled according to a machining amount, but, in a case where a shape accuracy could not be secured by only control of the machining speed, compensation is made using a compensation value for each arc radius stored in a memory. However, a method for obtaining the compensation value for each arc radius is not specified, so that experimental acquisition of compensation values corresponding to all arc radii requires much time and labor.

B-2: Japanese Patent Application Laid-Open No. 2004-148472 discloses a wire electric discharge machining method in which four points of modification are set at a corner portion and an appropriate feed speed is obtained by multiplying a set feed speed by the ratio between a removal distance for each section and a straight portion. A constant feed system is used for wire feed in this technique.

In the technique described above, the four points of modification are set and the appropriate feed speed is obtained by multiplying a set feed speed by the ratio between a removal distance for each section and a straight portion. However, it is actually difficult to set these points of modification, and constant-speed feed is a precondition, so that the scope of application of this technique is very narrow.

B-3: Japanese Patent No. 5077433 (corresponding to WO2010/001472) discloses a wire electric discharge machining apparatus configured so that a machining speed for a corner portion is calculated by multiplying "machining volume for each predetermined unit distance at corner portion"/"machining volume for each predetermined unit distance at straight portion" by an average speed for the straight portion.

According to the technique described above, the "machining volume for each predetermined unit distance" can be estimated to some degree from a machining program in the case of rough machining. In the case of finish machining, however, the machining allowances for various parts considerably vary depending on the degree of achievement of the rough machining, so that the "machining volume for each predetermined unit distance" cannot be estimated. Thus, this technique is not applicable to the finish machining.

According to the techniques B-1 to B-3, the shape accuracy of the circular-arc portion is improved by controlling the machining speed according to the machining amount.

SUMMARY OF THE INVENTION

Accordingly, in consideration of the above-described problems of the prior art techniques, the object of the present invention is to provide a wire electric discharge machine configured to perform speed commanding in consideration of the difference between a desired shape in a circular-arc corner portion and a machining path corresponding to the desired shape and capable of improving the shape accuracy of the circular-arc portion by controlling a command speed on the machining path in consideration of the difference between the arc length of the circular-arc portion in the desired shape and the arc length on the machining path corresponding to the desired shape.

The present invention relates to a wire electric discharge machine configured to perform machining by relatively moving a wire electrode and a workpiece based on a desired shape.

A first aspect of a wire electric discharge machine according to the present invention include: a desired-shape creation unit configured to create a desired shape with reference to a drawing; a machining path creation unit configured to create a machining path based on a discharge gap and/or a wire diameter in addition to the created desired shape; a machining speed calculation unit configured to calculate a machining speed based on a detected value of a machining voltage and/or a discharge pulse; a circular-arc determination unit configured to determine a circular-arc portion in the desired shape; a circular-arc speed control unit configured to control a command speed on the machining path, for a circular-arc portion in the desired shape that is determined to be a circular-arc portion by the circular-arc determination unit, based on a difference between an arc length of the desired shape and arc length on the machining path corresponding to the desired shape; and a wire movement control unit configured to move the wire electrode relative to the workpiece along the machining path, based on the command speed controlled by the circular-arc speed control unit.

A second aspect of a wire electric discharge machine according to the present invention include: a desired-shape creation unit configured to create a desired shape with reference to a drawing; a machining path creation unit configured to create a machining path based on a discharge gap and/or a wire diameter in addition to the created desired shape; a machining speed calculation unit configured to calculate a machining speed based on a detected value of a machining voltage and/or a discharge pulse; a circular-arc determination unit configured to determine a circular-arc portion in the machining path; a circular-arc speed control unit configured to control a command speed on the machining path, for a circular-arc portion in the machining path that is determined to be a circular-arc portion by the circular-arc determination unit, based on a difference between an arc length on the machining path and arc length of the desired shape corresponding to the machining path; and a wire movement control unit configured to move the wire electrode relative to the workpiece along the machining path, based on the command speed controlled by the circular-arc speed control unit.

The circular-arc speed control unit may be configured to control a command speed at the circular-arc portion in the machining path so that the discharge densities of circular-arc and straight portions on the desired shape per unit distance are uniform.

The circular-arc speed control unit may be configured to control a command speed at the circular-arc portion in the machining path so that the speed is higher at convex circular-arc portions on the machining path than at straight portions and lower at concave circular-arc portions on the machining path than at the straight portions.

The circular-arc speed control unit may be configured to control a command speed at the circular-arc portion in the machining path based on the ratio between the arc length on the machining path and the arc length of the desired shape corresponding to the machining path.

The circular-arc speed control unit may be configured to control a command speed at the circular-arc portion in the machining path based on the ratio between the radius of curvature of the circular-arc portion of the desired shape and that of the circular-arc portion on the machining path corresponding to the desired shape.

The machining speed calculated by the machining speed calculation unit may be a value variable depending on the plate thickness, material, or machining environment of the workpiece, and the circular-arc speed control unit is configured to control a command speed on the machining path based on the variable value.

The circular-arc speed control unit may be configured to control a command speed on the machining path so that the angular velocity of the circular-arc portion of the desired shape is equal to that of the circular-arc portion in the machining path corresponding to the desired shape.

According to the present invention, there can be provided a wire electric discharge machine configured to perform speed commanding in consideration of the difference between a desired shape in a circular-arc corner portion and a machining path corresponding to the desired shape and capable of improving the shape accuracy of a circular-arc portion by controlling a command speed on the machining path in consideration of the difference between the arc length of the circular-arc portion in the desired shape and the arc length on the machining path corresponding to the desired shape.

BRIEF DESCRIPTION OF THE DRAWINGS

The above and other objects and features of the present invention will be obvious from the ensuing description of embodiments with reference to the accompanying drawings, in which:

FIGS. 6A and 6B are exploded perspective views corresponding to FIG. 4A, in which FIG. 6A shows the straight portion and FIG. 6B shows the circular-arc portion;

FIGS. 7A and 7B are exploded perspective views corresponding to FIG. 4B, in which FIG. 7A shows the straight portion and FIG. 7B shows the circular-arc portion;

FIG. 8A is a diagram showing a relationship between a desired shape in a convex circular-arc portion and the corresponding machining path;

FIG. 8B is a diagram showing a relationship between a desired shape in a concave circular-arc portion and the corresponding machining path;

FIG. 9 is a diagram showing a relationship between a desired shape in a convex circular-arc portion and the corresponding machining path;

FIG. 10 is a diagram showing a program for finishing a machining shape;

FIG. 11 is a diagram showing an example of a table in which offset values are stored in association with offset numbers;

DETAILED DESCRIPTION OF THE PREFERRED EMBODIMENTS

Problem of Circular-Arc Portion

Figure 1A:
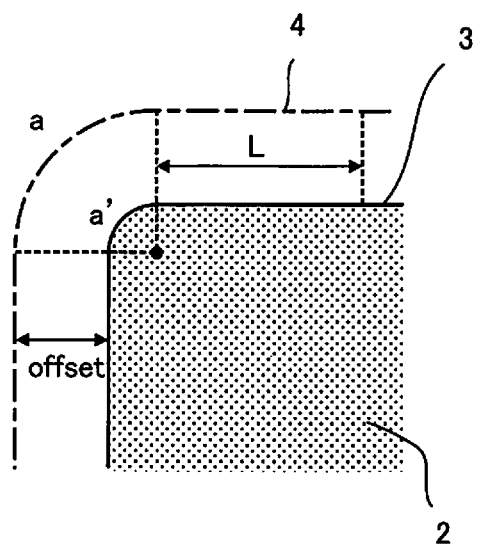
FIG. 1A is a diagram showing a relationship between a desired shape in a convex circular-arc portion and the corresponding machining path in case where the convex circular-arc portion is subjected to wire electric discharge machining.
Figure 1B:
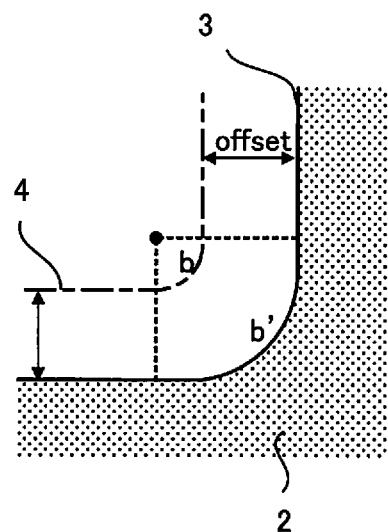
FIG. 1B is a diagram showing a relationship between a desired shape in a concave circular-arc portion and the corresponding machining path in case where the concave circular-arc portion is subjected to wire electric discharge machining.
Figure 2:
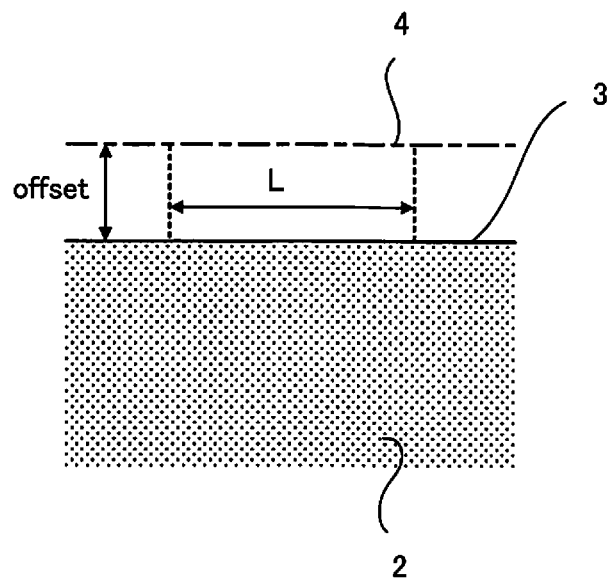
FIG. 2 is a diagram showing a relationship between a desired shape and the corresponding machining path in a straight portion of a workpiece.

FIG. 2 is a diagram showing a relationship between a straight portion of a desired shape 3 of a workpiece 2 and the corresponding machining path 4.

In wire electric discharge machining, the desired shape 3 is usually created in advance with reference to a drawing. A movement path of the center of a wire is created based on the desired shape 3 in consideration of the discharge gap, wire diameter, etc. This movement path of the wire center is referred to as machining path 4 herein.

In actual machining, a computerized numerical controller attached to a wire electric discharge machine controls the wire electric discharge machine so that a wire electrode (wire) relatively moves along the machining path, thereby finishing the workpiece 2 into the desired shape. In machining the straight portion, as shown in FIG. 2, the workpiece 2 is machined for an arbitrary distance L as the wire moves for the same distance L, since the straight portion of the desired shape 3 and its corresponding portion of the machining path 4 extend parallel to each other, as shown in FIG. 2. Thus, the moving distance of the wire is equal to the machining length of the workpiece.

Figure 3A:
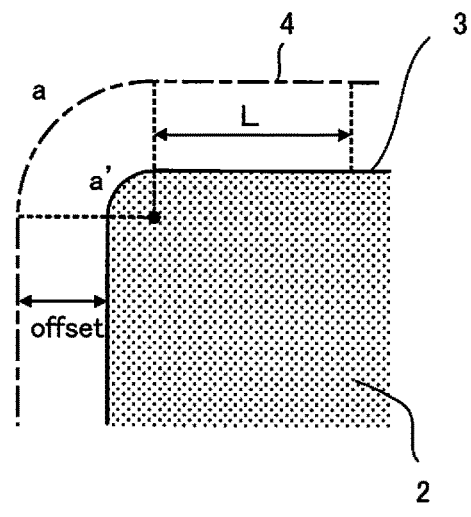
FIG. 3A is a diagram showing a relationship between a desired shape in a convex circular-arc portion of a workpiece and the corresponding machining path.
Figure 3B:
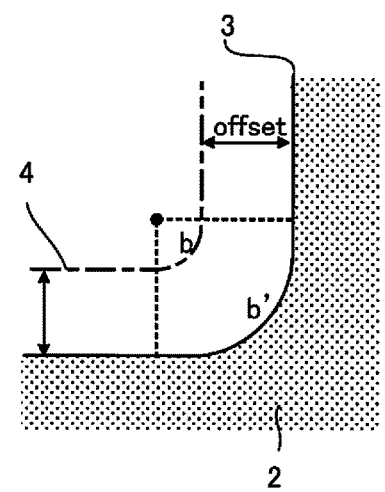
FIG. 3B is a diagram showing the relationship between a desired shape in a concave circular-arc portion of a workpiece and the corresponding machining path.

However, circular-arc portions shown in FIGS. 3A and 3B are machined under conditions considerably different from those of the machining of the straight portion shown in FIG. 2.

In the case of a convex circular arc, the machining distance for the desired shape 3 is shorter than its corresponding portion of the machining path 4, as shown in FIG. 3A, so that a distance a' for which the workpiece 2 is machined as the wire moves for an arbitrary distance a is shorter than the distance a. Therefore, the discharge density becomes so high that the workpiece is over-machined or machined deeper than in the machining of the straight portion. In the case of a concave circular arc, in contrast, the machining distance for the desired shape 3 is longer than its corresponding portion of the machining path 4, as shown in FIG. 3B, so that a distance b' for which the workpiece 2 is machined as the wire moves for an arbitrary distance b is longer than the distance b. Therefore, the discharge density becomes so low that under-machining occurs more easily than in the machining of the straight portion. Thus, over-machining and under-machining occur in the cases of machining the convex and concave circular-arc portions, respectively, so that the shape accuracy is inevitably reduced.

Accordingly, the present invention has been accomplished to provide a wire electric discharge machine configured to control a command speed on the machining path in consideration of the difference in arc length between a circular-arc portion of a desired shape and the corresponding portion of a machining path, thereby improving the shape accuracy of the circular-arc portion.

The difference in arc length between a machining path and the corresponding desired shape and the reduction in the shape accuracy due to the difference will be described with reference to FIGS. 4A (convex circular arc) and 4B (concave circular arc).

First, the case of the convex circular-arc machining will be described with reference to FIG. 4A.

The circle center of the circular-arc portion of the desired shape 3 of the workpiece 2 to be machined is defined as a point O. The points of intersection between full lines of the desired shape 3 and perpendicular lines from the point O to the full lines are denoted by A and B, individually. The points of intersection between a dash-dotted line indicative of the machining path 4 and respective extensions of line segments OA and OB to the machining path 4 are denoted by C and D, individually. Further, the point at a distance equal to a distance CD on the circular arc of the dash-dotted line indicative of the machining path 4 from the point C in the direction away from the point D is denoted by F. The point of intersection of one of the full lines of the desired shape 3 and a perpendicular line from the point F to the full line is denoted by E.

If the discharge density per unit distance is $E_a$, discharge energy $E_{CD}$ between the points C and D and discharge energy $E_{CF}$ between the points C and F can be obtained from equations (1) as follows:

$$E_{CD}=E_a \times CD$$

$$E_{CF}=E_a \times CF \quad (1)$$

Figure 4A:
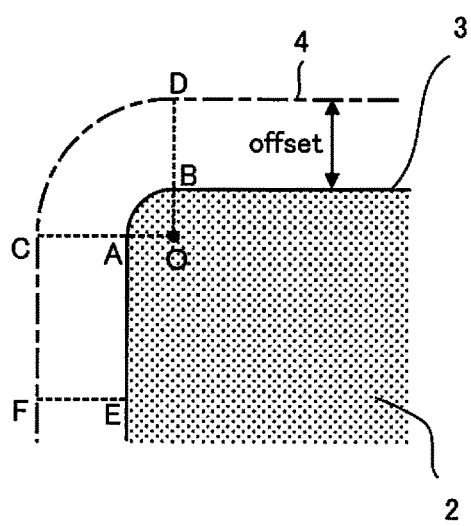
FIG. 4A is a diagram showing the difference in arc length (convex arc length) between a machining path and the corresponding desired shape.

If the wire moves for machining along the machining path CD, as shown in FIG. 4A, a section AB of the workpiece 2 is machined. If the wire moves for machining along the machining path CF, a section AE of the workpiece 2 is machined. Based on the discharge energies between the points C and D and between the points C and F on the machining path 4 calculated by equations (1), discharge densities $E_{AB}a$ and $E_{AE}a$ per unit distance in the sections AB and AE of the corresponding desired shape can be calculated by equations (2) as follows:

$$E_{AB}a=E_{CD}/AB$$

$$E_{AE}a=E_{CF}/AE \quad (2)$$

Since the distances between the points C and D and between the points C and F on the machining path 4 are equal, moreover, equations (2) can be rewritten into equations (3) as follows:

$$E_{AB}a=E_{CD}/AB=E_t/AB$$

$$E_{AE}a=E_{CF}/AE=E_t/AE \quad (3)$$

Figure 4B:
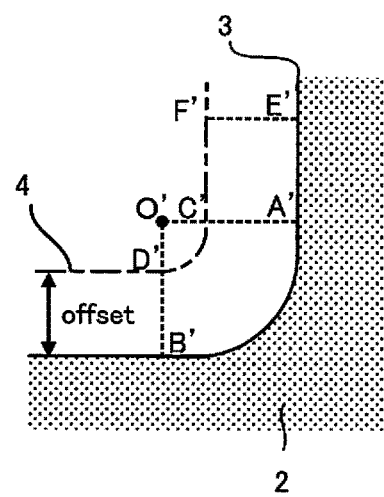
FIG. 4B is a diagram showing the difference in arc length (concave arc length) between a machining path and the corresponding desired shape.

Since AE=CF=CD>AB is given, we have $E_{AB}a>E_{AE}a$. In other words, the discharge density in the section AB of the desired shape is higher than that in the section AE. Consequently, the section AB of the circular arc is over-machined, so that the shape accuracy is inevitably reduced. For the same reason, a section A'B' of the concave circular arc shown in FIG. 4B is under-machined, since the discharge density in the section A'B' of the desired shape 3 is lower than that in a section A'E'.

According to the present invention, based on the consideration of the difference in arc length between a circular-arc portion of a desired shape 3 and the corresponding portion of a machining path, the command speed is controlled so that the discharge densities per unit distance in the circular-arc and straight portions of the desired shape are uniform (or equal), whereby the shape accuracy of the circular-arc portion is improved.

Speed Control

In the case of the convex circular arc, as described above, the discharge density per unit distance in the desired shape is higher than that in the straight portion due to the in arc length between a circular-arc portion of a desired shape and the corresponding portion of a machining path. In the case of the concave circular arc, in contrast, the discharge density per unit distance in the desired shape is lower than that in the straight portion. In order to secure the shape accuracy, therefore, the discharge densities per unit distance in the circular-arc and straight portions of the desired shape should be made uniform (or identical).

Thus, in the case of the convex circular arc, the discharge density per unit distance in the corresponding desired shape can be effectively prevented from becoming excessively high by making the machining speed on the machining path higher than that in the straight portion. In the case of the concave circular arc, in contrast, the discharge density per unit distance in the corresponding desired shape can be effectively prevented from becoming excessively low by making the machining speed on the machining path lower than that in the straight portion.

As described above, the shape accuracy of the circular-arc portion can be improved by controlling the command speed for the circular-arc portion so that the speed is increased for convex circular-arc machining or decreased for concave circular-arc machining. According to the present invention, moreover, the command speed for the circular-arc portion can be automatically obtained taking advantage of the relationship between an arc length of a desired shape and an arc length on the corresponding machining path. Thus, the trouble of experimentally obtaining coefficients, setting points of modification, etc., can be saved.

Based on the above consideration, the present invention provides the following wire electric discharge machine configured so that the command speed is controlled according to the difference between the desired shape of the circular-arc portion and the machining path.

Configuration of Wire Electric Discharge Machine of Present Invention

Figure 5:
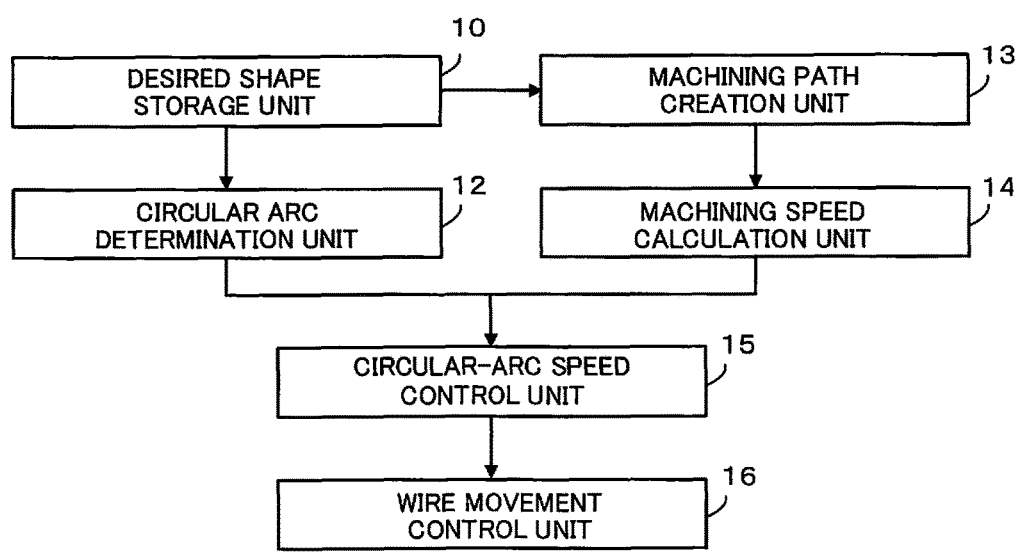
FIG. 5 is a diagram showing one embodiment of a wire electric discharge machine according to the present invention.

FIG. 5 is a diagram showing one embodiment of the wire electric discharge machine according to the present invention.

A desired shape created with reference to a drawing is stored in a desired-shape storing unit 10. A circular-arc determination unit 12 detects circular arcs in the desired shape stored in the desired-shape storing unit 10, analyzes data thereon, and extracts circular-arc portions. A machining path creation unit 13 creates a machining path in consideration of elements such as the discharge gap, wire diameter, etc., as well as the desired shape stored in the desired-shape storing unit 10. A machining speed calculation unit 14 automatically calculates a machining speed based on elements such as the machining voltage, discharge pulse, etc. A circular-arc speed control unit 15 compensates a command speed at a circular-arc portion of the machining path based on the machining speed calculated by the machining speed calculation unit 14, depending on the difference in arc length between the desired shape stored in the desired-shape storing unit 10 and the machining path created by the machining path creation unit 13. A wire movement control unit 16 controls respective axes of the wire electric discharge machine to move a wire (wire electrode) relative to a workpiece along the machining path.

In the configuration shown in FIG. 5, data on the desired shape stored in the desired-shape storing unit 10 is used in the extraction of the circular-arc portions by the circular-arc determination unit 12. Alternatively, however, the circular-arc portions may be extracted from data on the machining path created by the machining path creation unit 13.

In the configuration of the present invention shown in FIG. 5, the machining speed is calculated according to the machining voltage, discharge pulse, etc., so that the calculated machining speed complies with then circumstances. In addition to the machining speed calculation unit 14, however, there is a machining speed control unit carrying out constant-speed feed. Specifically, the machining speed is set in advance and the wire electrode and the workpiece are moved relative to each other at the same speed from beginning to end during machining. The present invention is characterized in that a machining speed at a circular-arc portion of a machining path is calculated according to the machining voltage, discharge pulse, etc., when the machining speed is controlled, therefore, the present invention also applies to the case of constant-speed feed of the wire.

Speed control for the case of the constant-speed feed will be described in connection with Embodiment 1. Speed control for the case where the machining speed is calculated according to the machining voltage, discharge pulse, etc, will be described in connection with Embodiment 2. A method for controlling the command speed based on the relationship between an arc length of a desired shape and an arc length on the corresponding machining path will be described in connection with Embodiment 3.

Embodiment 1

In order to secure the shape accuracy of the circular-arc portion, as described above, the discharge densities of the circular-arc and straight portions of the desired shape should be made uniform. The discharge densities can be made uniform by controlling the command speed at the circular-arc portion of the machining path. The following is a description of an example of the method for controlling the command speed.

(1) The case of the convex circular arc of FIG. 4A will be described by way of example. If a discharge density $E_T$ per unit time is constant and if average machining speeds in the sections AB and AE of the desired shape 3 are $v_{AB}$ and $v_{AE}$, respectively, a discharge per unit distance in the sections AB and AE of the desired shape 3 can be obtained from equations (4) as follows:

$$E_{AB}a = E_T \times v_{AB}$$

$$E_{AE}a = E_T \times v_{AE} \qquad (4)$$

In order to make the discharge densities per unit distance in the circular-arc and straight portions of the desired shape 3 uniform by equation (4), the average machining speeds in the sections AB and AE must satisfy the relationship expressed by equation (5) as follows:

$$v_{AB} = v_{AE} \qquad (5)$$

Figure 6A:
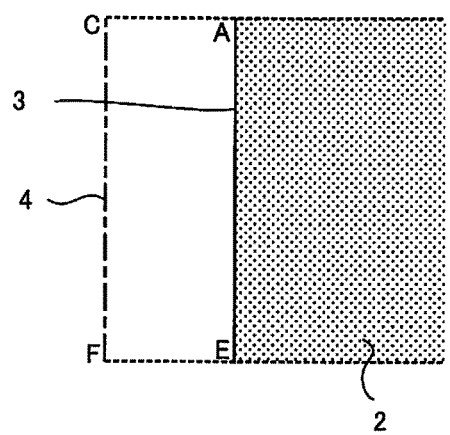
Figure 6B:
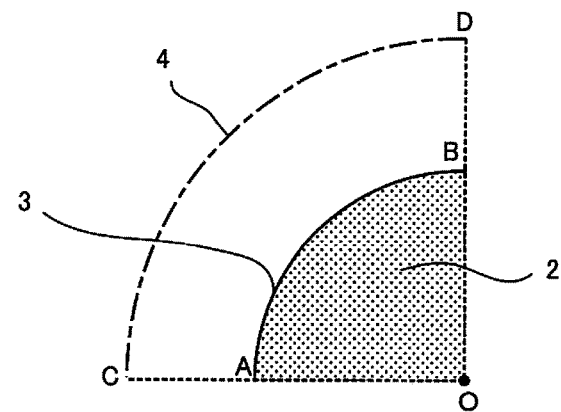

FIGS. 6A and 6B are exploded perspective views corresponding to FIG. 4A, in which FIG. 6A shows the straight portion AE and FIG. 6B shows the circular-arc portion AB.

The straight portion will be described first. If the time during which the wire moves along the machining path CF to machine the section AE of the workpiece 2 is t, the following relational expression or equation (6) can be obtained:

$$t = CF/v_{CF} = AE/v_{AE} \qquad (6)$$

Since CF on the machining path 4 is equal to AE in the desired shape 3 at the straight portion, the following relational expression or equation (7) for speed can be obtained:

$$v_{CF} = v_{AE} \qquad (7)$$

The following is a description of the circular-arc portion. If the time during which the wire moves along the machining path CD to machine the section AB of the workpiece 2 is t, the following relational expression or equation (8) can be obtained:

$$t = CD/v_{CD} = AB/v_{AB} \qquad (8)$$

Since CD on the machining path is not equal to AB in the desired shape at the circular-arc portion, the machining speed on the machining path is different from that in its corresponding desired shape, and the relationship between these machining speeds can be expressed by equation (9) as follows:

$$v_{CD} = (CD/AB) \times v_{AB} \qquad (9)$$

In order to make the discharge densities in the circular-arc and straight portions uniform (or identical), as described above, the speed relationship expressed by equation (5) must be satisfied. In order to secure the shape accuracy of the circular-arc portion by equations (5), (7) and (9), therefore, the command speed on the machining path should only be controlled based on equation (10) as follows:

$$v_{CD} = (CD/AB) \times v_{CF} \qquad (10)$$

Figure 7A:
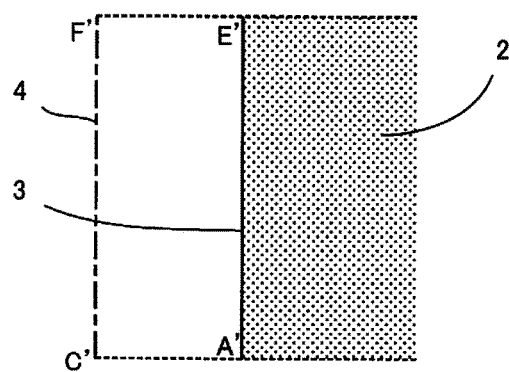
Figure 7B:
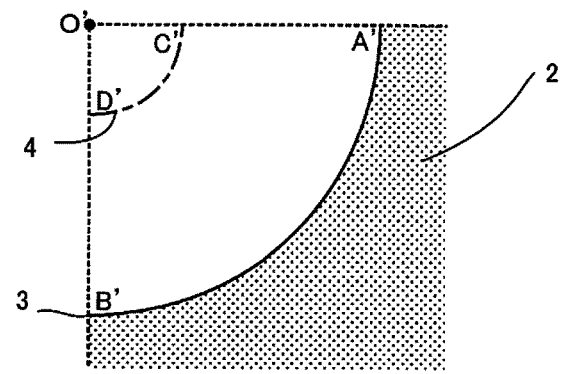

(2) The case of the concave circular arc of FIG. 4B will be described by way of example. FIGS. 7A and 7B are exploded perspective views corresponding to FIG. 4B, in which FIG. 7A shows the straight portion and FIG. 7B shows the circular-arc portion. Based on the same concept as for the convex circular arc, the following speed control expression or equation (11) can be obtained:

$$v_{C'D'} = (C'D'/A'B') \times v_{C'F'} \qquad (11)$$

where $v_{C'D'}$ is a command speed output by the circular-arc speed control unit and $v_{C'F'}$ is a preset machining speed.

Thus, in the case of the constant-speed feed based on the speed control expression for the convex and concave circular arcs, the command speed at the circular-arc portion can be obtained from equation (12) as follows:

Circular-arc command speed on machining path={
(Arc length on machining path)/(Arc length on desired shape)}×Set machining speed. (12)

Embodiment 2

In the case of a circular-arc portion, as described in connection with Embodiment 1, if the command speed on the machining path is reflected on its corresponding desired shape, depending on the difference in arc length between the desired shape and the machining path, a difference is generated. In the case of a convex circular arc, the arc length of the desired shape is shorter than that on the machining path, so that the machining speed at the desired shape is lower than that on the actual machining path. In the case of a concave circular arc, the arc length of the desired shape is longer than that on the machining path, so that the machining speed at the desired shape is higher than that on the actual machining path.

In the case where the machining speed is calculated according to the machining voltage, discharge pulse, etc., the machining speed is controlled so that the discharge densities in the straight and circular-arc portions on the machining path are uniform (or identical). For the reason described above, however, the machining speed at the desired shape of the circular-arc portion is different from that on the machining path. Even if the discharge density on the machining path is made uniform, therefore, that in the desired shape cannot be uniform.

Since the desired shape corresponds to the contour of an actual end product, the discharge densities at various parts of the desired shape directly affect a finished shape. In order to secure the shape accuracy of the circular-arc portion, therefore, the discharge density in the corresponding desired shape must be made uniform.

In order to make the discharge densities at the various parts of the desired shape uniform, the machining speeds at the various parts of the desired shape must be made equal to the actually calculated machining speed. Thus, the machining speed at the corresponding desired shape should only be made equal to the actually calculated machining speed by controlling the machining speed on the machining path.

FIG. 8A is a diagram showing a relationship between a desired shape in a convex circular-arc portion and the corresponding machining path, and FIG. 8B is a diagram showing a relationship between a desired shape in a concave circular-arc portion and the corresponding machining path.

(1) The case of the convex circular arc of FIG. 8A will be described by way of example. If the machining speed on the machining path CD calculated by the machining speed calculation unit is $v_{CD}$, the machining speed at the desired shape must be set to $v_{CD}$ in order to make the discharge density in the desired shape uniform. If the time of movement of the wire electrode relative to the workpiece is t, for the circular-arc portion of FIG. 8A, equation (13) can be obtained as follows:

$$t=AB/v_{CD} \quad (13)$$

The time of movement of the wire electrode on the desired shape relative to the workpiece is equal to that on the machining path. If the command speed on the machining path output by the circular-arc speed control unit is v, therefore, equation (14) can be obtained as follows:

$$t=CD/v \quad (14)$$

Based on equations (13) and (14) given above, the control speed on the machining path can be obtained by equation (15) as follows:

$$v=(CD/AB) \times v_{CD} \quad (15)$$

(2) The case of the concave circular arc of FIG. 8B will be described by way of example. Based on the same concept as for the convex circular arc, the following speed control expression or equation (16) can be obtained:

$$v'=(C'D'/A'B') \times v_{C'D'} \quad (16)$$

where v' is a command speed output by the circular-arc speed control unit and $v_{C'D'}$ is a machining speed calculated by the machining speed calculation unit.

Thus, in calculating the machining speed according to the machining voltage, discharge pulse, etc., based on the speed control expression for the convex and concave circular arcs, the command speed at the circular-arc portion can be obtained from equation (17) as follows:

Circular-arc command speed on machining path={
(Arc length on machining path)/(Arc length on desired shape)}×Machining speed calculated by machining speed calculation unit.  (17)

According to this method, the trouble of setting some coefficients, points of modification, etc., can be saved, so that an operator's burden can be considerably reduced.

Embodiment 3

In wire electric discharge machining, as mentioned before, a desired shape is usually created in advance with reference to a drawing. A movement path of the center of a wire, based on this desired shape in consideration of the discharge gap, wire diameter, etc., is referred to as "machining path". The discharge gap, wire diameter, etc., as added conditions, are collectively referred to as "offset".

As described in connection with Embodiments 1 and 2, the command speed for the circular-arc portion can easily be obtained taking advantage of the relationship of arc length between a desired shape and the corresponding machining path. FIG. 9 is a diagram showing a relationship between a desired shape in a convex circular-arc portion and the corresponding machining path. As seen from FIG. 9, the desired shape and the machining path are concentric with each other at the circular-arc portion.

The proportional relationship in length between circular arcs of concentric circles with the same central angle, based on arc radii, can be expressed by equation (18) as follows:

$$CD/AB=(\pi R \cdot \theta/180°)/(\pi r \cdot \theta/180°)=R/r \quad (18)$$

where r is the arc radius of the desired shape AB, R is the arc radius of the machining path CD, and e is the central angle of the circular arcs AB and CD.

Based on the calculation formulas described in connection with Embodiment 2, the following equation (19) can be obtained using the desired shape and the arc radius on the machining path. Equation (19) requires three essential factors; the arc radius on the machining path, the arc radius on the desired shape corresponding to the machining path, and the machining speed calculated by the machining speed calculation unit 14. The control speed on the machining path can easily be obtained based on these three factors only.

Circular-arc command speed on machining path={
(Arc radius of machining path)/(Arc radius on desired shape)}×Machining speed calculated by machining speed calculation unit.  (19)

In finishing a machining shape according to a program shown in FIG. 10, for example, one of the three essential factors can be identified by outputting the value of the arc radius described in the program to the circular-arc speed control unit.

As described above, moreover, the machining path is based on the desired shape plus the offset. Specifically, there is a relation "arc radius of machining path=arc radius of desired shape+offset value", as shown in FIG. 9.

The program 1 shown in FIG. 10 includes a description of the offset as well as the description of the arc radius. Accordingly, two essential factors, including the arc radius of the desired shape, can be identified by outputting the offset value (see FIG. 11) corresponding to an offset number to the circular-arc speed control unit 15.

Since the speed of movement of the wire electrode on the machining path relative to the workpiece can be calculated by the machining speed calculation unit 14 shown in FIG. 5, the three essential factors, including the two factors described above, can easily be obtained. According to this method, the command speed can be automatically controlled by the circular-arc speed control unit 15, so that the trouble of setting some coefficients, points of modification, etc., can be saved.

Figure 12:
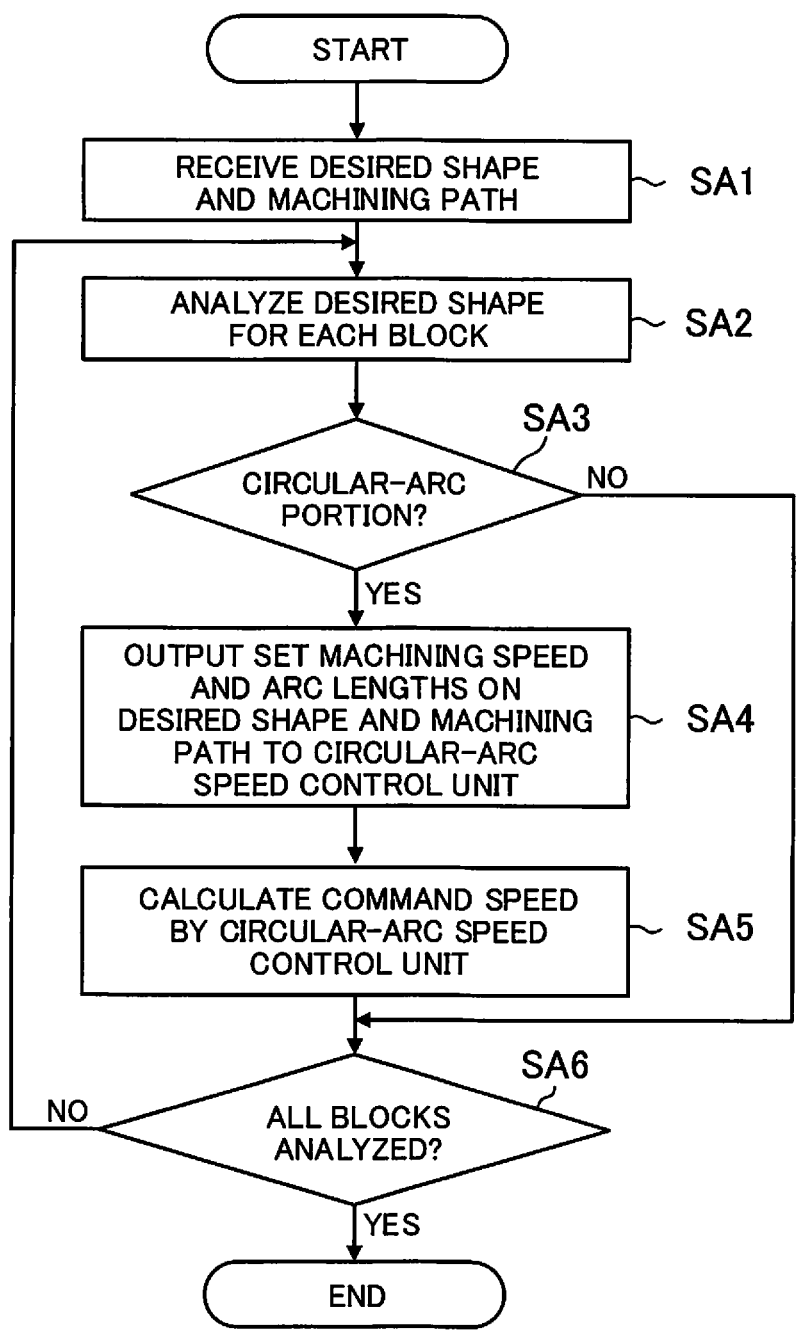
FIG. 12 is a flowchart showing processing for controlling a command speed on the machining path performed by Embodiment 1 of the wire electric discharge machine according to the present invention.

Processing for controlling the command speed on the machining path, performed by Embodiment 1 of the wire electric discharge machine according to the present invention, will be described with reference to the flowchart of FIG. 12.

The desired shape and the machining path are received (Step SA1) and the received desired shape is analyzed for each block (Step SA2). It is determined whether or not the analyzed desired shape is a circular-arc portion (Step SA3). If the desired shape is the circular-arc portion, a preset machining speed, the arc length of the desired shape, and the arc length on the machining path are output to the circular-arc speed control unit (Step SA4), and the command speed is calculated according to equation (12) set by the circular-arc speed control unit (Step SA5), whereupon the processing proceeds to Step SA6. If the desired shape is not determined to be the circular-arc portion in Step SA3, the processing proceeds to Step SA6.

Then, in Step SA6, it is determined whether or not all blocks are analyzed. If any unanalyzed blocks are left, the processing returns to Step SA2. If the analysis of all the blocks is completed, this control processing ends.

Processing for controlling the command speed on the machining path, performed by Embodiment 2 of the wire electric discharge machine according to the present invention, will be described with reference to the flowchart of FIG. 13.

The desired shape and the machining path are received (Step SB1) and the received desired shape is prefetched and analyzed for each block (Step SB2). It is determined whether or not the analyzed desired shape is a circular-arc portion (Step SB3). If the desired shape is the circular-arc portion, the machining speed calculated by the machining speed calculation unit is received (Step SB4), the received machining speed, the arc length of the desired shape, and the arc length on the machining path are output to the circular-arc speed control unit (Step SB5), and the command speed is calculated according to equation (17) set by the circular-arc speed control unit (Step SB6), whereupon the processing proceeds to Step SB7. If the desired shape is not determined to be the circular-arc portion in Step SB3, the processing proceeds to Step SB7.

Then, in Step SB7, it is determined whether or not all blocks are analyzed. If any unanalyzed blocks are left, the processing returns to Step SB2. If the analysis of all the blocks is completed, this control processing ends.

Figure 13:
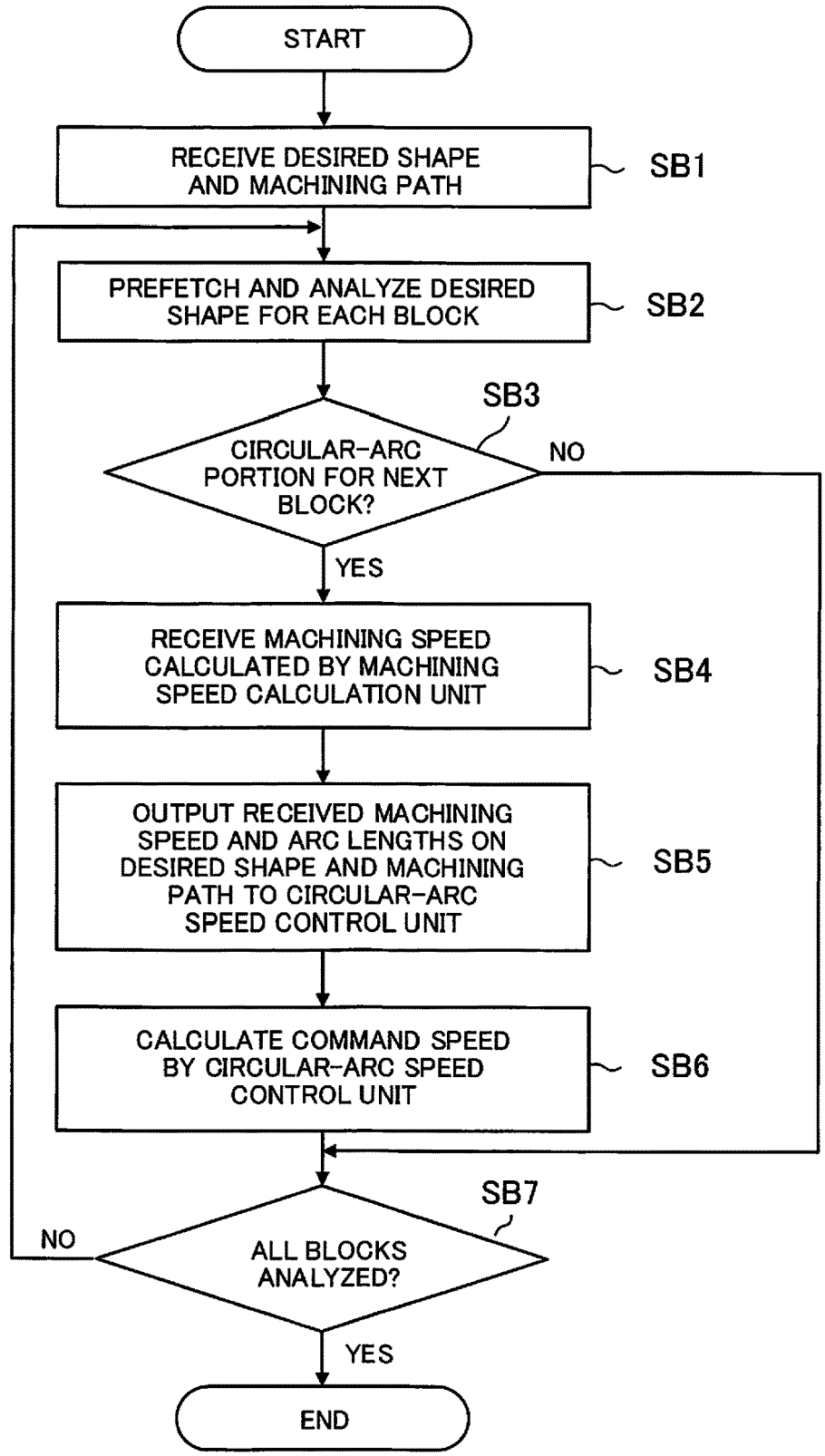
FIG. 13 is a flowchart showing processing for controlling a command speed on the machining path performed by Embodiment 2 of the wire electric discharge machine according to the present invention.

Since processing for controlling the command speed on the machining path, performed by Embodiment 3 of the wire electric discharge machine according to the present invention, is similar to the processing (Embodiment 2) shown in the flowchart of FIG. 13, a description thereof is omitted.

The following is a description of the effect of the present invention.

The present invention is intended to improve the shape accuracy of circular-arc portions and is based on the attention to the uniformity of discharge densities that affects the shape accuracy. The discharge densities at various parts of the desired shape are made uniform by controlling the command speed on the machining path, in consideration of change in discharge densities due to the difference in arc length between a desired shape and the corresponding machining path. In this way, the shape accuracy of the circular-arc portions is improved.

In the present invention, moreover, only the ratio between an arc length of a desired shape and an arc length on the corresponding machining path is used as a coefficient for controlling the machining speed, so that the trouble of preparing some coefficients can be saved. Since the start and end points of a circular arc can easily be identified by the machining program, moreover, the trouble of setting some points of modification can also be saved. The present invention is also characterized in that the machining speed can be automatically controlled without human intervention in a case where the program includes data such as the arc length, arc radius, etc., in particular. Further, an improvement of the shape accuracy can also be achieved for a single circular arc as well as for circular arcs at corner portions.

Thus, according to the present invention, there can be provided a wire electric discharge machine with a circular-arc speed control unit capable of considerably reducing labor for preparation of various points of modification and compensation values and applicable to a wide variety of circular-arc machining.

The following is a supplemental description of differences between the present invention and the techniques described in the prior art documents mentioned above.

(1) The present invention is configured to control a command speed on a machining path in consideration of the difference in arc length between a desired shape and the corresponding machining path, in order to make the speed of feed in the desired shape a desired machining speed, without controlling any electrical conditions, such as current. Further, the present invention essentially differs from the arrangement in which normal straight-line machining is controlled under high-speed machining conditions whereas circular-arc machining is controlled under medium-speed machining conditions. In the present invention, machining speed is not reduced at circular-arc portions but is controlled depending on the state of the circular-arc portions. In some cases, a command speed at circular-arc portions can be made higher than at straight portions. In this respect, the present invention distinctly differs from the technique described in Japanese Patent Application Laid-Open No. 2001-162446, mentioned above.

(2) The present invention comprises a machining speed calculation unit configured to calculate a machining speed based on a machining voltage, discharge pulse, etc., and a circular-arc speed calculation unit configured to calculate a command speed at a circular-arc portion so that the discharge density for machining the circular-arc portion is equal to that for the straight portion in consideration of the difference in arc length between a desired shape and the corresponding machining path in machining the circular-arc portion. On the other hand, the technique described in Japanese Patent Application Laid-Open No. 6-126536, mentioned above, includes speed target value calculation means for calculating a speed target value obtained as a function of a programmed arc radius and an electrode offset amount and calculation means for setting a speed target value as a command speed if the command speed is not less than the speed target value in the circular-arc machining. This is distinctly different from the configuration of the present invention. According to this prior art technique, moreover, no attention is focused on the difference in arc length between a desired shape and the corresponding machining path in speed calculation.

(3) The present invention is configured to control a command speed at the circular-arc portion based on the machining speed calculated by the machining speed calculation unit, in consideration of the difference in arc length between a desired shape and the corresponding machining path, not controlling the machining speed based on the machining amount. On the other hand, the technique described in Japanese Patent No. 5241850, mentioned above, is configured so that compensation values for individual arc radii stored in a memory are used for compensation if shape accuracy cannot be secured by only controlling a machining speed in accordance with the machining amount. A method for obtaining these compensation values is not specified, so that the compensation values cannot be determined based on the relationship between an arc length of a desired shape and an arc length on the corresponding machining path. Further, experimental acquisition of these compensation values requires much time and labor. The present invention does not require any such time and labor. While this prior art technique is configured to obtain the compensation values in consideration of only the locus of the center of the wire, that is, the arc radius on the machining path, moreover, the present invention is configured to control a command speed, focusing attention on the difference in arc length between a desired shape and the corresponding machining path.

(4) The present invention is configured to control a command speed in consideration of the difference in arc length between a desired shape of a circular-arc portion and the corresponding portion of a machining path, not controlling the machining speed based on the difference in removal distance between straight and circular-arc portions. The technique described in Japanese Patent Application Laid-Open No. 2004-148472, mentioned above, requires setting of some points of modification, which is difficult in actual operation. According to the present invention, in contrast, speed control can easily be achieved based on the relationship between an arc radius of a desired shape and an arc radius of the corresponding machining path, without setting any points of modification. While the present invention includes the machining speed calculation unit configured to calculate a machining speed based on a machining voltage, discharge pulse, etc., moreover, this prior art technique is based on a constant feed system.

(5) The present invention is configured to control a command speed in consideration of the difference in arc length between a desired shape of a circular-arc portion and the corresponding portion of a machining path, not controlling a command speed based on a machining volume for each predetermined unit distance. Thus, the present invention is distinctly different from the technique described in Japanese Patent No. 5077433, mentioned above.

The invention claimed is:

1. A wire electric discharge machine which performs machining by relatively moving a wire electrode and a workpiece based on a desired shape, the wire electric discharge machine comprising:
   a desired-shape creation unit configured to create a desired shape with reference to a drawing;
   a machining path creation unit configured to create a machining path based on a discharge gap and/or a wire diameter in addition to the created desired shape;
   a machining speed calculation unit configured to calculate a machining speed based on a detected value of a machining voltage and/or a discharge pulse;
   a circular-arc determination unit configured to determine a circular-arc portion in the desired shape;
   a circular-arc speed control unit configured to control a command speed on the machining path, for a concave or convex circular-arc portion in the desired shape that is determined to be a circular-arc portion by the circular-arc determination unit, based on a difference between a circular arc length of the desired shape and a circular arc length on the machining path corresponding to the desired shape; and
   a wire movement control unit configured to move the wire electrode relative to the workpiece along the machining path, based on the command speed controlled by the circular-arc speed control unit.

2. A wire electric discharge machine which performs machining by relatively moving a wire electrode and a workpiece based on a desired shape, the wire electric discharge machine comprising:
   a desired-shape creation unit configured to create a desired shape with reference to a drawing;
   a machining path creation unit configured to create a machining path based on a discharge gap and/or a wire diameter in addition to the created desired shape;
   a machining speed calculation unit configured to calculate a machining speed based on a detected value of a machining voltage and/or a discharge pulse;
   a circular-arc determination unit configured to determine a circular-arc portion in the machining path;
   a circular-arc speed control unit configured to control a command speed on the machining path, for a concave or convex circular-arc portion in the machining path that is determined to be a circular-arc portion by the circular-arc determination unit, based on a difference between a circular arc length on the machining path and a circular arc length of the desired shape corresponding to the machining path; and
   a wire movement control unit configured to move the wire electrode relative to the workpiece along the machining path, based on the command speed controlled by the circular-arc speed control unit.

3. The wire electric discharge machine according to claim 1, wherein the circular-arc speed control unit is configured to control a command speed at the circular-arc portion in the machining path so that the discharge densities of circular-arc and straight portions on the desired shape per unit distance are uniform.

4. The wire electric discharge machine according to claim 1, wherein the circular-arc speed control unit is configured to control a command speed at the circular-arc portion in the machining path so that the speed is higher at convex circular-arc portions on the machining path than at straight portions and lower at concave circular-arc portions on the machining path than at the straight portions.

5. The wire electric discharge machine according to claim 1, wherein the circular-arc speed control unit is configured to control a command speed at the circular-arc portion in the machining path based on the ratio between the circular arc length on the machining path and the circular arc length of the desired shape corresponding to the machining path.

6. The wire electric discharge machine according to claim 1, wherein the circular-arc speed control unit is configured to control a command speed at the circular-arc portion in the machining path based on the ratio between the radius of curvature of the circular-arc portion of the desired shape and that of the circular-arc portion on the machining path corresponding to the desired shape.

7. The wire electric discharge machine according to claim 1, wherein the machining speed calculated by the machining speed calculation unit is a value variable depending on the plate thickness, material, or machining environment of the workpiece, and the circular-arc speed control unit is configured to control a command speed on the machining path based on the variable value.

8. The wire electric discharge machine according to claim 1, wherein the circular-arc speed control unit is configured to control a command speed on the machining path so that the angular velocity of the circular-arc portion of the desired shape is equal to that of the circular-arc portion in the machining path corresponding to the desired shape.

* * * * *